United States Patent [19]
Wassel

[11] 3,934,134
[45] Jan. 20, 1976

[54] LAMP MOUNTING FOR A MATERIAL-HANDLING TRACTOR

[75] Inventor: Hilary S. Wassel, Terre Haute, Ind.

[73] Assignee: J. I. Case Company, Racine, Wis.

[22] Filed: Mar. 3, 1975

[21] Appl. No.: 554,756

[52] U.S. Cl.............. 240/57; 37/118 A; 240/7.1 R
[51] Int. Cl.².......................................... B60Q 1/00
[58] Field of Search........... 240/57, 52 R, 61, 61.11, 240/7.1 R; 37/118 A, 118 R; 172/276; 248/291

[56] References Cited
UNITED STATES PATENTS

| | | | |
|---|---|---|---|
| 1,743,535 | 1/1930 | Edmondson | 240/61 X |
| 1,746,118 | 2/1930 | Johnston | 240/57 X |
| 2,749,431 | 6/1956 | Dover | 240/57 X |

Primary Examiner—R. L. Moses
Attorney, Agent, or Firm—Arthur J. Hansmann

[57] ABSTRACT

A lamp mounting for a material-handling tractor including a boom pivotally mounted on the tractor and having a material-handling bucket on the extending end of the boom. A lamp mounting member is pivotally mounted on the boom, and a link is connected between the tractor and the pivotally-mounted member for orienting the member in accordance with, but different from, the pivotal movement of the boom. A headlamp and a floodlamp are mounted on the lamp mounting member for illuminating the bucket in all pivoted positions of the boom, including the lower position of loading the bucket and the raised position of dumping the bucket, and the lamps are adjustable for directing their beams forwardly.

8 Claims, 2 Drawing Figures

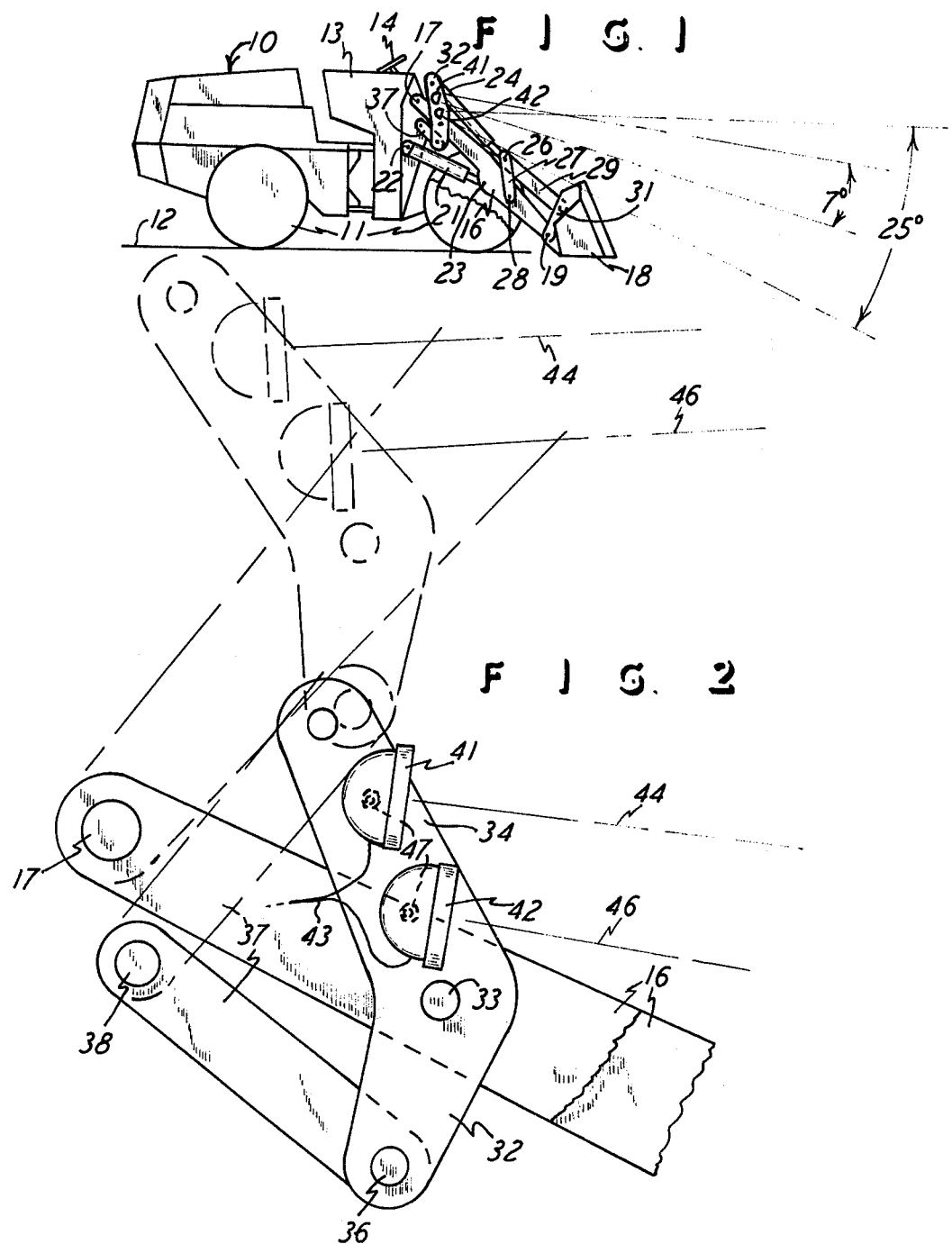

LAMP MOUNTING FOR A MATERIAL-HANDLING TRACTOR

This invention relates to a lamp mounting for a material-handling tractor, and, more particularly, it relates to a mounting for supporting lamps on the boom of a tractor such that the material-handling bucket will be illuminated in the various raised and lowered positions of the bucket.

BACKGROUND OF THE INVENTION

Illumination of work tools and the like by means of lamps is very old in the industrial arts generally. That is, the prior art is already aware of different arrangements of lamps on apparatus having work tools which are illuminated by the lamp. Further, the prior art is aware of having the lamps movably mounted on the apparatus so that the operator can direct the beam of light to the desired location on either the material being worked on or on the work tool or the like itself.

The present invention pertains to the mounting of a lamp in relation to a material-handling bucket which is pivotally mounted on a tractor. The general purpose and main advantage of the present invention is to mount the lamp so that the bucket, or the area immediately therearound, can be illuminated in all raised and lowered positions of the bucket, that is, in all positions of pivot of the boom which is on the tractor and supporting the bucket. Accordingly, it is the primary object of this invention to accomplish the aforementioned and to do so with reliable and accurately functioning mounting members, and with the entire arrangement being of a relatively simple and inexpensive nature.

Still further, the present invention provides for the mounting of lamps in relation to a pivotally-mounted material-handling bucket on a tractor, and with the arrangement being such that the lamp will generally direct a beam of light at the top of the bucket, when the bucket is in the lowered position adjacent the ground and being filled, and the lamp will direct its beam in the general direction of the bottom of the bucket, when the bucket is in the raised position over a truck or the like and the contents of the bucket are to be emptied into the truck. That is, the lamp is arranged so that the operator can see the material when the bucket is being loaded, and that is when the lamp is illuminating the material being loaded, and also the operator can see the bucket and the material when the bucket is raised and is being emptied.

Still further, the present invention provides for the mounting of a vehicle headlight type of lamp and also a flood type of lamp, with both lamps being mounted on a movable mounting member which automatically adjusts its orientation to that of a pivotally-mounted boom on which the lamp mounting member is pivoted.

Other objects and advantages will become apparent upon reading the following description in light of the accompanying drawings.

BRIEF DESCRIPTION OF THE DRAWINGS

FIG. 1 is a side elevational view of a tractor and its material-handling apparatus and the lamps and mounting members of this invention.

FIG. 2 is an enlarged view of a fragment of the apparatus shown in FIG. 1, and with the dot-dash lines showing that fragment of apparatus in a different position.

DETAILED DESCRIPTION OF THE PREFERRED EMBODIMENT

FIG. 1 shows a conventional type of tractor, generally designated 10, and it has ground engaging wheels 11 and is of course supported on the ground designated 12. Further, the tractor has an operator's station designated 13 and the station 13 is located rearwardly of a steering wheel 14 which is controlled by the operator, all in a conventional and usual arrangement.

A boom 16 is pivotally mounted on the tractor at a pivot mounting designated 17, and the extending end of the boom 16 has a material handling bucket 18 pivoted to the boom at the pivot connection designated 19, and that may all be of a conventional arrangement. A power cylinder assembly 21 is pivotally mounted between the tractor and the boom 16 at pivot connections 22 and 23, respectively. The cylinder assembly 21 extends and contracts and is of a conventional arrangement and is conventionally powered, all for up and down pivot movement of the boom 16 about its pivot connection 17. Also, a cylinder assembly 24 is pivotally connected in a manner shown in FIG. 1 such that the rod end of the assembly 24 is pivotally connected at a connection 26 to a link 27 which in turn is pivotally connected at a pivot connection 28 on the boom 16. Also, a link 29 is pivotally connected between the connection 26 and a connection 31 on the back of the bucket 18. With that arrangement of the connection for the cylinder assembly 24, it will be seen and understood that the cylinder 24 determines and controls the pivot of the bucket 18 about its pivot connection 19 on the boom 16, especially in view of the hereinafter described support and connection for the rear end of the cylinder assembly 24.

FIGS. 1 and 2 show a lamp mounting member 32 which is pivotally connected and mounted on the beam 16 through a pin 33. The member 32 has an upper portion above the pin 33 and designated 34, and it has a lower portion adjacent a pin 36 which is pivotally connected to a link 37 which in turn is pivotally mounted on the tractor by means of a pin 38.

With the arrangement shown and described, it will be seen and understood that the lamp mounting member 32 is in the nature of a bellcrank controlled by the link 37 which is an alignment member for determining the upright orientation of the member 32 in accordance with and in response to and throughout the range of pivot of the boom 16. That is, FIG. 2 shows the boom 16 in its lower pivoted position, and it shows the member 32 in solid lines in accordance with the lowered pivot position of the boom 16; and FIG. 2 shows the boom 16 in dot-dash lines representing the raised pivoted position of the boom 16, and it shows the member 32 in dot-dash lines in the corresponding raised position. In the range of positions for the member 32 between the lowered solid-line position and the raised dot-dash line position of FIG. 2, the member 32 remains substantially upright in its orientation, all by virtue of the connection with the alignment member 37 which is also shown in dot-dash lines in FIG. 2 in the raised position of those members.

FIG. 2 further shows that there are actually two boom members 16, and they are disposed parallel to each other in side-by-side relation and are both pivotally mounted on the pivot connection 17. Also, there are two mounting members 32 on each of the two booms 16, one on each side thereof, and each member 32 is pivotally mounted on the pivot pin 33. Finally, there is only one link or alignment member 37 for each pair of members 32, and the member 37 carries the pivot pin 36 which pivotally connects to the respective lower end of each of the members 32. With this arrangement, the member 37 can swing up between the two booms 36, to achieve the dot-dash line position for the member 37 as shown in FIG. 2. Also, the pair of members 32 on each boom 16 can pivot or swing on the outside of each boom 16, to also achieve the dot-dash line position of FIG. 2.

A headlamp 41 and a floodlamp 42 are mounted on the outer one of the mounting members 32, as shown in FIGS. 1 and 2. Electric wires 43 extend from the tractor and to the two lamps 41 and 42, in any conventional wiring arrangement, so that the lamps can be energized and illuminate in the forward direction of the apparatus, and each lamp is of a sealed beam type having a central axis designated 44 and 46 as indicated in FIG. 2. Further, the lamps 41 and 42 can be adjustably mounted on the member 32, by means of the adjusting nuts 47, and thus the lamp beams 42 and 46 can be directed upwardly and downwardly, with respect to the horizontal, as required and desired.

FIG. 1, and the solid-line showing of FIG. 2, show the direction of the beams of the lamps 41 and 42 when the boom is in the lowered position, and here it will be seen that the floodlamp 42 is mounted below the headlamp 41 and casts a beam having an angle of approximately 25°, and the headlight lamp 41 casts a beam having an angle of approximately 7°. In both instances of the lamp beams and when the boom 16 is in its lowered position, the beams are directed substantially horizontally but across the upper portion of the bucket 18 which is shown in the material-loading position, for example. Thus, the ground or road in advance of the bucket 18 is illuminated by the two lamps 41 and 42 in the FIG. 1 and solid-line FIG. 2 position of the boom 16. However, when the boom 16 is raised to its upper position, such as for dumping the bucket into a truck or the like, and this is the position shown in the dot-dash lines in FIG. 2, then the beam axis 44 and 46 are directed slightly above the true horizontal direction, as shown in FIG. 2, and that direction causes the lamps to illuminate toward the bottom of the raised bucket 18, and then the operator can see the bucket and still see forwardly of the tractor and he can see the contents being emptied from the bucket. That is, in the bucket-raised position, the lamp beams 44 and 46, and their subtended angles as shown in FIG. 1, illuminate the bottom of the bucket and therebelow when the boom 16 is in its raised position such as shown by the dot-dash lines of FIG. 2.

In the present invention, and according to the arrangement described, the lamps are therefore automatically adjustably mounted on the boom 16 for casting their beam of illumination forwardly, in accordance with but not with the same angle of pivoting the boom 16. The lamps 41 and 42 themselves may be of a conventional arrangement, and thus the lamp 41 is a conventional headlight lamp for a tractor, and the lamp 42 is a conventional flood type of lamp. When the boom 16 is lowered, the headlamp 41 does not have its beam blocked by the bucket 18, and this is also true when the boom 16 is raised to the dot-dash position of FIG. 2, and thus the tractor can be used in transport without having the headlight beam blocked by the bucket 18. The lamps 41 and 42 are adjustable in their beam up and down orientation in mounting 32 by means of a screw post and nut assembly at 47.

What is claimed is:

1. In a tractor-mounted material-handling bucket apparatus of the type including a tractor and a boom pivotally mounted on the tractor for up and down pivotal movement and a bucket pivotally supported by said boom and being movable between a lowered loading position and a raised dumping position, the improvement comprising a lamp mounting member movably connected with said boom for movement in response to and according to pivotal movement of said boom, an alignment member connected with said lamp mounting member for moving said lamp mounting member relative to said boom and thereby align said lamp mounting member according to but different from the various up and down pivoted positions of said boom on said tractor, and a lamp attached to said lamp mounting member for illuminating toward said bucket.

2. The tractor-mounted material-handling bucket apparatus as claimed in claim 1, wherein said lamp mounting member is pivotally mounted on said boom.

3. The tractor-mounted material-handling bucket apparatus as claimed in claim 2, wherein said alignment member is a link pivotally connected with both said tractor and said lamp mounting member.

4. The tractor-mounted material-handling bucket apparatus as claimed in claim 2, wherein said lamp mounting member has a portion extending away from the location of the pivot mounting on said boom, and said lamp being a sealed beam type of lamp and adjustably mounted on said portion whereby the beam from said lamp can be directed to the upper portion of said bucket, when said boom is in its lowered pivotal position, and to the lower portion of said bucket, when said boom is in its raised pivotal position.

5. The tractor-mounted material-handling bucket apparatus as claimed in claim 1, including an additional said lamp on said lamp mounting member, the two said lamps bieng of the sealed beam type and mounted adjacent each other with the axis of their beams being parallel to each other, one of said lamps being a flood type of lamp and the other of said lamps being a vehicle headlight type of lamp, and with said one lamp having an overall angle of its beam greater than that of said other lamp.

6. The tractor-mounted material-handling bucket apparatus as claimed in claim 1, wherein said lamp mounting member is pivotally mounted on said boom and has a portion extending away from the location of the pivotal mounting, said lamp being attached to said lamp mounting member on said portion thereof and being of a beam type oriented with said beam being directed substantially horizontally in the pivotally lowered position of said boom, and said alignment member being a link pivotally connected with both said tractor and said lamp mounting member and being of a length between its said pivotal connections and being pivotally connected at locations relative to the pivotal mounting of said boom on said tractor and of said lamp mounting member on said boom to have said lamp mounting member remain substantially in its same vertical orientation throughout the pivoting of said boom, whereby said beam is again directed substantially horizontally in the pivotally raised position of said boom.

7. The tractor-mounted material-handling bucket apparatus as claimed in claim 6, including an additional said lamp mounted on said lamp mounting member, both said lamps being of the sealed beam type, and with one thereof having a beam of an angle greater than that of the other.

8. The tractor-mounted material-handling bucket apparatus as claimed in claim 1, wherein said lamp mounting member is pivotally mounted on said boom and is pivotally connected with said alignment member in a manner to render said lamp mounting member in the nature of a bellcrank.

* * * * *